(12) United States Patent
Price et al.

(10) Patent No.: US 10,964,111 B2
(45) Date of Patent: Mar. 30, 2021

(54) CONTROLLING CONTENT INCLUDED IN A SPATIAL MAPPING

(71) Applicant: MICROSOFT TECHNOLOGY LICENSING, LLC, Redmond, WA (US)

(72) Inventors: Raymond Kirk Price, Redmond, WA (US); Yuri Pekelny, Seattle, WA (US); Michael Bleyer, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/047,269

(22) Filed: Jul. 27, 2018

(65) Prior Publication Data

US 2020/0035024 A1   Jan. 30, 2020

(51) Int. Cl.
| | | |
|---|---|---|
| G06T 19/00 | (2011.01) | |
| G06F 21/44 | (2013.01) | |
| G06K 9/20 | (2006.01) | |
| G06T 15/20 | (2011.01) | |
| G06T 17/05 | (2011.01) | |
| G06N 20/00 | (2019.01) | |
| G06T 17/20 | (2006.01) | |

(52) U.S. Cl.
CPC ............ *G06T 19/006* (2013.01); *G06F 21/44* (2013.01); *G06K 9/2054* (2013.01); *G06N 20/00* (2019.01); *G06T 15/20* (2013.01); *G06T 17/05* (2013.01); *G06K 2209/27* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 9,342,929 B2 | 5/2016 | Kamuda et al. | |
| 9,646,410 B2 | 5/2017 | Collet Romea et al. | |
| 10,732,797 B1 * | 8/2020 | Perez, III | ............. G02B 27/017 |
| 2012/0115513 A1 | 5/2012 | Han | |

(Continued)

FOREIGN PATENT DOCUMENTS

EP   2800055 A1   11/2014

OTHER PUBLICATIONS

Damala, et al., "Adaptive Augmented Reality for Cultural Heritage: Artsense Project", In Proceeding of Euro-Mediterranean Conference, Oct. 29, 2012, pp. 746-755.
"International Search Report and Written Opinion Issued in PCT Application No. PCT/US2019/039360", dated Sep. 20, 2019, 12 Pages.
"International Search Report and Written Opinion Issued in PCT Application No. PCT/US2019/040437", dated Sep. 11, 2019, 15 Pages.

(Continued)

*Primary Examiner* — Peter Hoang
(74) *Attorney, Agent, or Firm* — Workman Nydegger

(57) ABSTRACT

In some instances, undesired content is selectively omitted from a mixed-reality scene via use of tags. An environment's spatial mapping is initially accessed. Based on an analysis of this spatial mapping, any number of segmented objects are identified from within the spatial mapping. These segmented objects correspond to actual physical objects located within the environment and/or to virtual objects that are selected for potential projection into the mixed-reality scene. For at least some of these segmented objects, a corresponding tag is then accessed. A subset of virtual content is then generated based on certain attributes associated with those tags. The content that is included in the subset is specially chosen for actual projection. Thereafter, the selected content is either projected into the mixed-reality scene or scheduled for projection.

19 Claims, 13 Drawing Sheets

(56) References Cited

U.S. PATENT DOCUMENTS

| | | |
|---|---|---|
| 2014/0204077 A1 | 7/2014 | Kamuda et al. |
| 2015/0016714 A1 | 1/2015 | Chui |
| 2016/0148433 A1* | 5/2016 | Petrovskaya ......... G06T 19/006 345/633 |
| 2017/0004649 A1 | 1/2017 | Collet romea et al. |
| 2017/0084082 A1 | 3/2017 | Mctaggart et al. |
| 2017/0109940 A1* | 4/2017 | Guo ....................... G06T 19/20 |
| 2017/0205875 A1 | 7/2017 | Kaehler |
| 2018/0089905 A1* | 3/2018 | Solenthaler ............. G06T 11/60 |
| 2018/0124371 A1 | 5/2018 | Kamal et al. |
| 2020/0035020 A1 | 1/2020 | Price et al. |

OTHER PUBLICATIONS

Tan, et al., "Cloud-Based Depth Sensing Quality Feedback for Interactive 3D Reconstruction", In Proceeding of International Conference on Acoustics, Speech and Signal Processing, Mar. 25, 2012, pp. 5421-5424.

"Non Final Office Action Issued in U.S. Appl. No. 16/047,265", dated Nov. 29, 2019, 21 Pages.

"International Search Report and Written Opinion Issued in PCT Application No. PCT/US2019/039360", dated Oct. 29, 2019, 12 Pages.

"Final Office Action Issued in U.S. Appl. No. 16/047,265", dated May 28, 2020, 22 Pages.

"Non-Final Office Action Issued in U.S. Appl. No. 16/047,265", dated Sep. 16, 2020, 22 Pages.

* cited by examiner

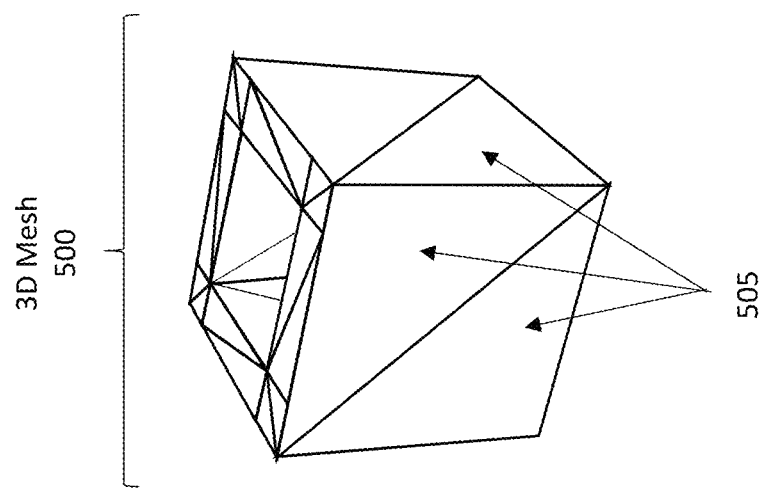

CONTROLLING CONTENT INCLUDED IN A SPATIAL MAPPING

BACKGROUND

Mixed-reality systems, including virtual-reality (VR) and augmented-reality (AR) systems, have received significant attention because of their ability to create truly unique experiences for their users. For reference, conventional VR systems create a completely immersive experience by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting holograms that are placed in or that interact with the real world. As used herein, a "hologram" is a virtual image/object (either two-dimensional or three-dimensional) that is formed by projecting light patterns to form a desired design. Examples of holograms include, but are not limited to, virtual cars, planes, text, graphics, videos, books, magazines, laser guns, dragons, zombies, and others. It will be appreciated that a mixed-reality system is able to project and render any kind of hologram in any shape, dimension, size, or configuration.

As used herein, VR and AR systems are described and referenced interchangeably. Unless stated otherwise, the descriptions herein apply equally to all types of mixed-reality systems, which (as detailed above) include AR systems, VR systems, and/or any other similar system capable of displaying holograms.

Some of the disclosed mixed-reality systems use one or more on-body devices (e.g., the HMD, a handheld device, etc.). The HMD provides a display that enables a user to view overlapping and/or integrated visual information (e.g., holograms) in whatever environment the user is in, be it a VR environment, an AR environment, or any other type of environment. Continued advances in hardware capabilities and rendering technologies have greatly improved how mixed-reality systems render holograms. Notwithstanding these advances, the process of immersing a user into a mixed-reality environment creates many challenges and difficulties, particularly with regard to determining which content should be projected for a user to view.

For instance, there are many difficulties associated with selecting appropriate content to display in a mixed-reality environment. Current methodologies are in place to scan an environment in order to reconstruct any geometric surfaces included within that environment. This scanning process includes obtaining multiple images of the environment and then generating spatial mappings of the environment, which are consulted and used for presenting virtual content to mixed-reality system users. Sometimes, spatial mappings are shared between disparate mixed-reality systems, which enables virtual content to be broadly used and accessed. Unfortunately, however, not all of the content in the spatial mappings is appropriate for all users to view. As such, there is a need to improve the manner in which content is selectively made available for projection to a user in mixed-reality environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments are directed to computer systems, wearable devices, and methods for controlling the presentation of content in mixed-reality environments and, even more particularly, to systems for detecting and filtering objectionable or undesired virtual content from mixed-reality environments.

In some embodiments, a spatial mapping of an environment is initially accessed or retrieved. This spatial mapping includes information that describes the environment three-dimensionally. For instance, the spatial mapping may, in some cases, include color, texture, color texturing, and/or other surface geometry information. By analyzing the spatial mapping, segmented objects that are included within the spatial mapping are identified. These segmented objects correspond (1) to actual physical objects located in the environment and/or (2) to virtual objects that are selected for potential projection into a mixed-reality scene/environment. In some use-scenarios, the segmented objects also include colored, color textured, or other types of textured segmented objects. Some of these virtual objects have or are associated with a tag. This tag is useful to help select or otherwise filter virtual content. For instance, a subset of virtual content can be generated. The subset of content is selectively chosen from the above-recited virtual objects, and content included in the subset is selected based on certain determined attributes of the corresponding tags. Furthermore, this subset of virtual content is content that is selected for actual projection into the mixed-reality environment, while other content is selectively filtered out from the selected subset of virtual content to be projected. Thereafter, the subset of virtual content is either actually projected into the mixed-reality environment, or it is scheduled for projection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates a 3D mesh and, in particular, how a triangular 3D mesh can be used to describe the geometric surfaces of an object.

DETAILED DESCRIPTION

Figure 1:
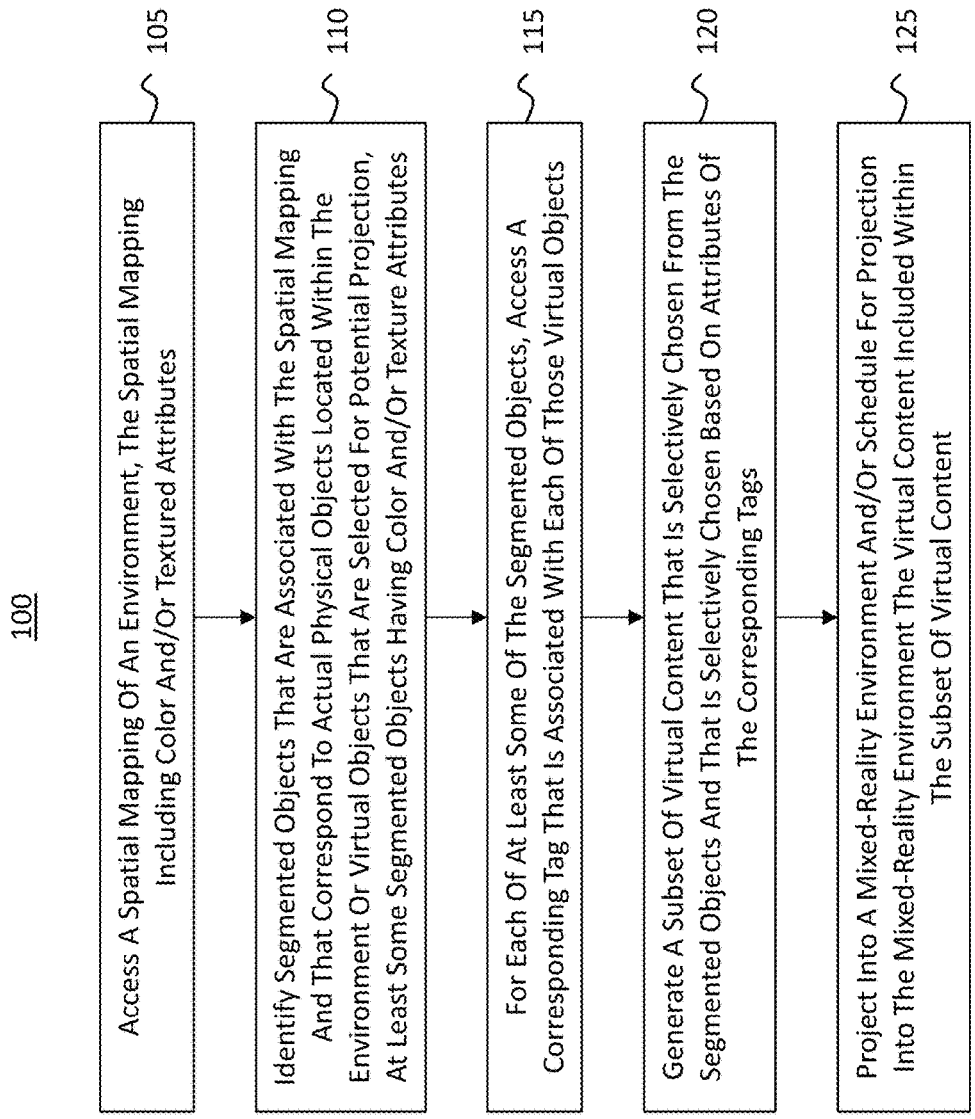
FIG. 1 illustrates a flowchart of an example method for detecting, eliminating, and/or preventing objectionable or undesired virtual content from being included in a mixed-reality scene via the use of tagged content.

The disclosed embodiments relate to computer systems, wearable devices (e.g., head-mounted devices), and methods that selectively isolate objectionable or undesirable virtual content from acceptable virtual content through the use of filtering. In some embodiments, an environment's spatial mapping, which can include color, color texturing, and/or other types of texture information, is initially accessed. A set of segmented objects (e.g., real-world and/or virtual objects) are then identified from within this spatial mapping. Some of the segmented objects in the set include and/or are otherwise associated with a tag (e.g., a metadata tag or some other kind of tag parameter or attribute). A subset of virtual content is then generated from the set of segmented objects using these tags. The content in the subset of virtual content is selected for being projected into a mixed-reality environment/scene. In this regard, any number of virtualized content/items can be selectively isolated or filtered from other virtual items when determining which content will be rendered for viewing.

By practicing the disclosed principles, significant advantages and benefits can be realized both in terms of improvements to the technology and improvements to how systems operate. For instance, with the increasing popularity of mixed-reality systems, there is a need to control the type of content that is provided to different users. As an example, some virtual content may not be appropriate for young children to view. Consequently, it is highly advantageous to control a mixed-reality's 3D space and what content is included therein. The disclosed embodiments operate to provide solutions to these needs by tagging virtual content and then filtering/controlling the rendering of virtual content using the tags. These tags can be engineered or designed to include any kind of data or information to classify or identify the associated virtual content. The classifications and data can then be used to help developers, system administrators, or even autonomous computer systems in determining which content to display. In this regard, significant benefits are provided in the realm of 3D virtual space.

Additionally, the disclosed embodiments also operate to improve the underlying functionality and efficiency of a computer system. As an example, in determining the overall pipeline or processes for rendering virtual content, the disclosed embodiments cause certain decisions (e.g., should content be projected) to be made much earlier in the pipeline. It is often the case that making earlier decisions leads to an overall more efficient process in general. Additionally, by selectively filtering content from being displayed or projected, the embodiments improve a computer's efficiency by causing only actually-desired content to be rendered. For these and other reasons, which will be discussed in more detail later, the disclosed embodiments provide valuable technical solutions, advancements, and benefits to the current technology.

Example Methods for Ensuring 3D Space Integrity

In some instances, benefits described above may be achieved through the use and application of a specialized filtering process applied before and/or during rendering of holograms in a mixed-reality environment. As an initial matter, it is noted that during design of a mixed-reality environment/scene, a hologram can be "placed" at a certain area or region within the mixed-reality environment. Use of the term "placed" means that the hologram has been assigned to operate within the selected area. As an example, consider a classroom setting. Here, a professor can design a mixed-reality environment for his/her students by placing different holograms at different (or even overlapping) regions within the classroom. For instance, a hologram can be placed on the top of the professor's desk, holograms can be placed in the air immediately in front or above each student, and a large theatre-like hologram can be projected near the front of the classroom. Such positioning enables the students to view and potentially interact with these holograms. In this regard, holograms are assigned locations within a particular environment in which to operate and to perform their designed holographic functions. That being said, it will be appreciated that any number of holograms may be assigned to a given environment. For instance, in the classroom example, that particular classroom may be used by 2, 3, 4, 5, 6, or any number of different professors, each with his/her own classroom agenda and specific holograms. As such, there may be an innumerable number of holograms that are actually located within the same environment or region (e.g., the same classroom).

The disclosed embodiments operate to selectively filter which holograms are made available for viewing based on satisfaction of one or more specified filtering parameters. To do so, the embodiments initially identify which holograms are currently available for projection (i.e. the potentially innumerable number of holograms that have been assigned to a particular environment and that may potentially overlap with one another). Then, the embodiments identify and analyze a tag for those holograms, identify and analyze an attribute of interest (e.g., a user attribute, a device attribute, or another circumstantial attribute), and determine whether a relationship between the tag and the attribute of interest adequately satisfies the specified filtering parameter. If the filtering parameter is satisfied, then the hologram is selected for projection. On the contrary, if the filtering parameter is not satisfied, then the hologram is omitted/filtered from being projected. With reference to the classroom example, consider a scenario where the professor has entered a filtering parameter specifying that only biology-tagged holograms are permitted for viewing by the students during the lecture's time period. As a result, the embodiments identify which holograms are currently present in the environment (e.g., there may potentially be biology-tagged holograms, physics-tagged holograms, mathematics-tagged holograms, etc.) and then filter out any holograms having non-biology tags so that those filtered holograms are not projected to the students in the classroom during the lecture's time period.

Therefore, although there may be a very large number of holograms available for potential projection (e.g., all of the holograms from all of the many lectures that can occur in the same classroom), the disclosed embodiments selectively filter the holograms in a manner so as to satisfy the specified filtering parameters.

For reference, a "tag" refers to a portion of metadata that describes a particular feature, characteristic, or attribute of its corresponding hologram. The disclosed embodiments use the information evidenced by a hologram's tag to determine whether the relationship between the tag and another attribute of interest (e.g., a user attribute, device attribute, etc.) satisfies the filtering parameter. Additional features and descriptions of tags will be provided later.

Figure 2:
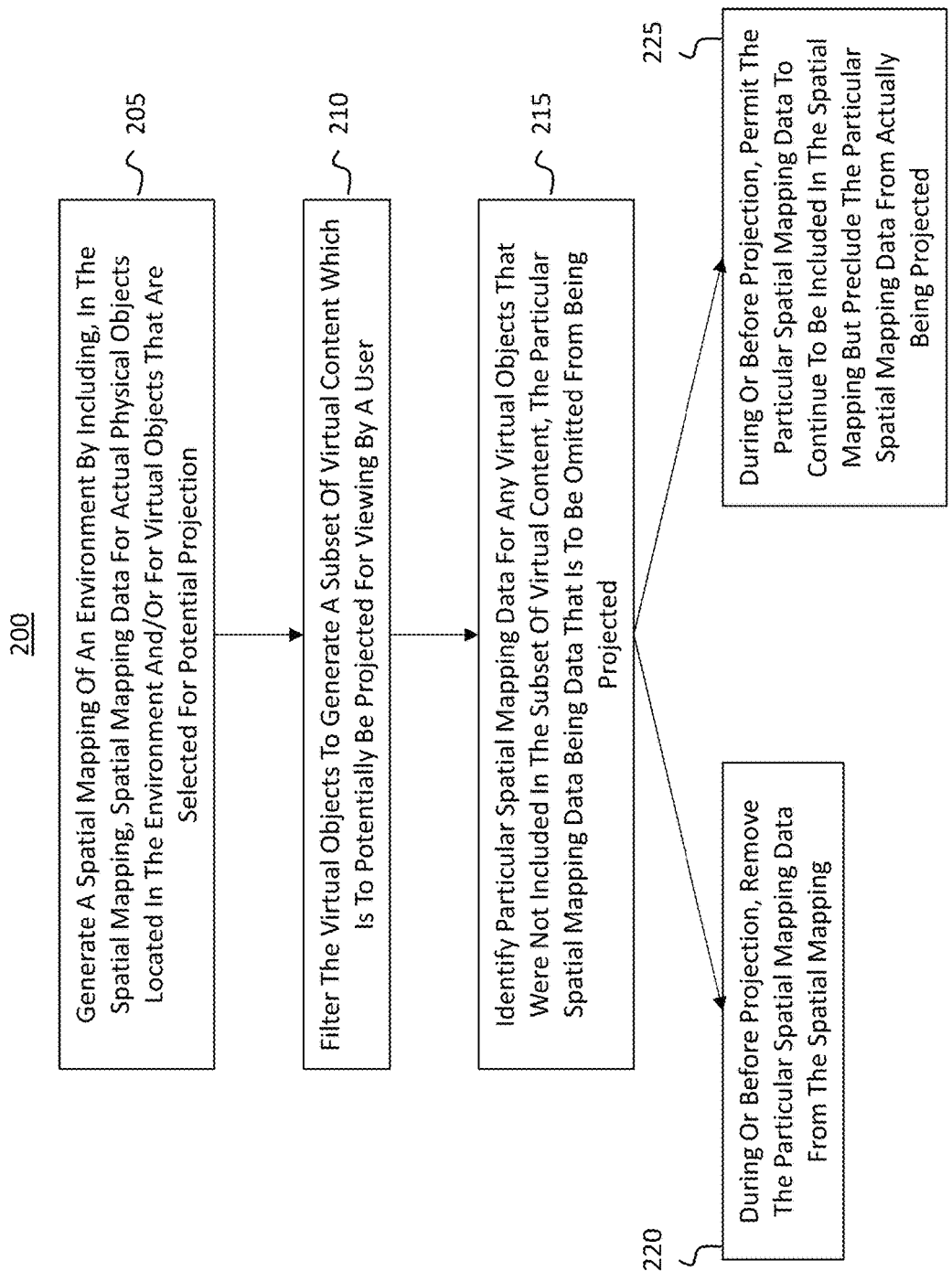
FIG. 2 illustrates a flowchart of an example method for filtering virtual content from a spatial mapping.
Figure 3:
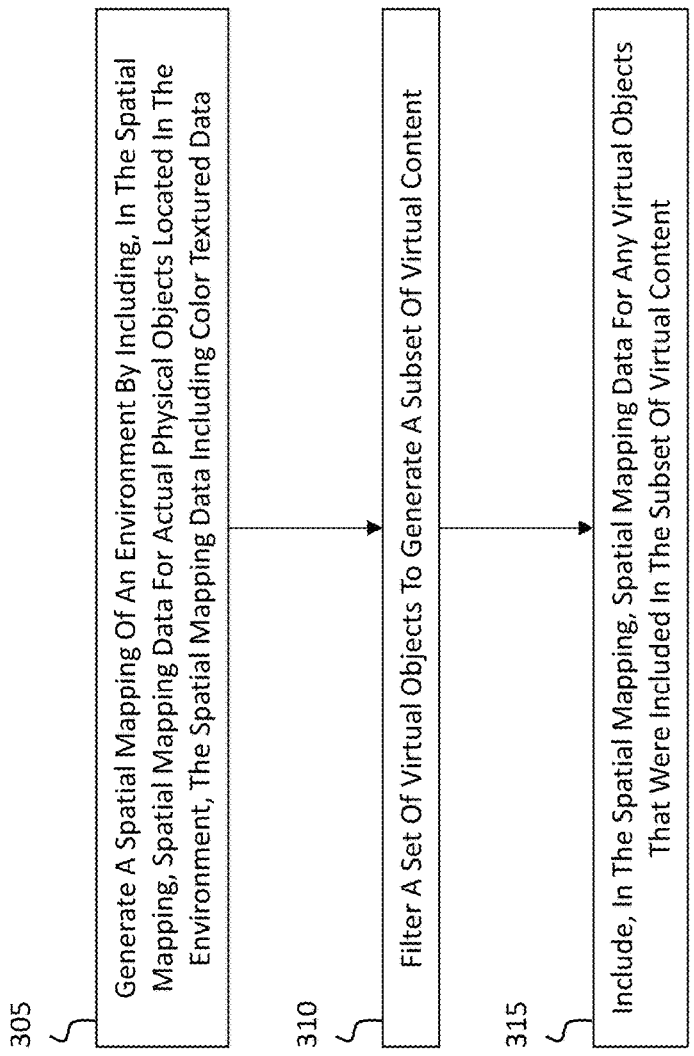
FIG. 3 illustrates another flowchart of an example method for filtering virtual content.

Attention will now be directed to FIGS. 1 through 3 which refer to a number of method acts that may be performed. Although the method acts may be discussed in a certain order or illustrated in a flowchart as occurring in a particular order, no particular ordering is required unless specifically stated, or required because an act is dependent on another act being completed prior to the act being performed.

FIG. 1 shows a flowchart of an example method 100 for detecting, eliminating, or even preventing (i.e. collectively "filtering") objectionable or undesired virtual content from being included or accessed in a spatial mapping and/or from being projected into a mixed-reality scene via use of tagged content. It will be appreciated that method 100 can be implemented by any type of computer system (e.g., the computer system shown later in FIG. 12). As used herein, a "spatial mapping" refers to a digital representation or construct of an environment. A spatial mapping may generated from or may include, but is not limited to, any number of depth maps, 3D dot/point clouds, and/or a 3D mesh. Further details on a spatial mapping will be provided later.

Initially, method 100 includes an act (105) of accessing a spatial mapping of an environment. This spatial mapping includes information describing the environment three-dimensionally. For example, the spatial mapping can include depth information, color information, or even texture information about the environment as a whole, including any objects located within the environment. For reference, "color" may be used to signify varying degrees of depth or texture for a given object, thus representing the object three-dimensionally. Some embodiments use a monochromatic coloring scheme while others use a chromatic coloring scheme to signify depth.

By performing an analysis that includes an examination of the spatial mapping, any number of segmented objects can be identified from within the spatial mapping (act 110). Using the classroom example from above, the spatial mapping may include information about the potentially innumerable number of holograms that are placed in that particular classroom environment. As such, the spatial mapping may potentially describe a large number of holograms, where some (or perhaps even many) may not be relevant for a particular user to view, based on whether the filtering parameters are satisfied by the relationship between a hologram's tag and another attribute of interest (e.g., the professor specifies that only biology-tagged holograms are projectable for his/her students, where the students are the other "attribute of interest").

In some cases, the segmented objects can correspond to actual physical objects located within the environment (e.g., desks, tables, chairs, walls, lights, fixtures, etc.) and/or to virtual objects that are selected for potential projection into the mixed-reality environment (e.g., virtual automobiles, virtual laser guns, virtual animals, etc.). By "potential projection," it is meant that these virtual objects are not yet being rendered for viewing by a user of the mixed-reality system (i.e. the holograms are assigned to and/or are present in that environment, but they are not currently being projected). Instead, these virtual objects are marked or otherwise identified as being candidate virtual items that are being considered for inclusion in the mixed-reality environment/scene. As an example, and with reference to the earlier discussion, it is advantageous to initially gauge whether certain virtual content is appropriate for a particular type or class of user. For instance, a scary zombie hologram may not be appropriate for a young child to view because of the inherent scariness of zombies. As such, that hologram can be filtered out.

For each of at least some of the virtual objects that are selected for potential projection into the mixed-reality environment (e.g., the virtual objects/holograms that are initially selected for potential projection could (at least initially) be all of the holograms that are located within a particular environment, such as the classroom), a corresponding tag is accessed (act 115). A tag is associated with each of those virtual objects. In some instances, the tag comprises metadata that is directly attached to or associated with the virtual object data structure. In other instances, metadata about the virtual object is stored in a database or other type of repository/warehouse, and the tag references the stored metadata. Regardless, it will be appreciated that the virtual content (e.g., objects) can be associated with metadata and metadata tags, which can be used to further describe the virtual content and attributes for displaying and/or filtering the objects from being displayed. These features will be further described in relation to FIG. 9.

A subset of the available/identified virtual content is then selectively chosen (act 120), based on the attributes/tagging information associated with the virtual content. In some cases, the content that is included in this subset is selectively chosen from the virtual objects that were discussed above. Additionally, determining which content will be included in the subset may be based on one or more determined attributes, parameters, or features of each of the corresponding tags. Forming this subset is beneficial because the content included in the subset is selected for actual projection/rendering (either immediately or scheduled for the future) into the mixed-reality environment. In some cases, generating the subset of virtual content is also based on at least one of a physical location of the computer system, a hardware attribute of the computer system, a user attribute, and one or more automatic and/or manually selected filter parameter(s).

Using the classroom example from before, the disclosed embodiments identified a potentially innumerable number of holograms placed within the classroom. The embodiments also analyzed a relationship between the holograms' tags and another attribute of interest (e.g., the user's or device's attributes) and determined that, as a result of the analysis, some of the many holograms do not satisfy the filtering parameters (e.g., physics-tagged holograms are not relevant to biology students during a biology lecture). As such, the embodiments filtered the innumerable number of holograms to identify only the relevant holograms in order to satisfy the filtering parameters.

After the subset of virtual content is organized or otherwise formed, then that virtual content can either be projected into the mixed-reality environment and/or scheduled for projection into the mixed-reality environment (act 125). For example, the biology-tagged holograms can be projected while any physics, mathematics, or other subject area holograms that are also placed/located within the same classroom setting (i.e. non-relevant holograms with regard to a biology lecture) are omitted or refrained from being projected (i.e. they are "filtered").

FIG. 2 illustrates another flowchart of an example method 200 for determining which virtual content will be rendered by a mixed-reality computer system. Initially, a spatial mapping of an environment is generated (act 205). Generating the spatial mapping may be performed by including, in the mapping, spatial mapping data for actual physical objects located in the real-world environment where the system is operating and/or for virtual objects that are selected for potential projection into the mixed-reality environment (e.g., the spatial mapping may initially include information about all of the potentially many holograms that are assigned or placed in a particular environment/region). It will be appreciated that "spatial mapping data" may include many different types of data, such as, for example, depth information from one or more depth maps, 3D point cloud information, 3D mesh information, color information, texture information, or any other kind of surface reconstruction data. The subsequent figures more fully describe aspects of a spatial mapping and how it is able to describe, three-dimensionally, an environment.

Subsequently, the virtual objects are filtered (act 210). This step is performed in order to generate a subset of virtual content which is to potentially be projected for viewing by a user using the mixed-reality system. Consider a scenario where (1) a tag identifies a hologram as being appropriate only for users 7 years and older, (2) a 12 year old user is engaged in a mixed-reality environment, and (3) a filtering parameter specifies that hologram age restrictions are to be imposed. Because the relationship between the user and the tag satisfies the filtering parameter (i.e. the 12 year old is older than 7 years), the 12 year old user will be able to view and interact with the hologram in the mixed-reality environment. Now, consider a scenario where the tag identifies the hologram as being appropriate only for mature users (i.e. users 17 years and older). In this scenario, the relationship between the user and the tag fails the filtering parameter because the user is not yet 17 years old. Consequently, this hologram will be filtered from view by the 12 year old user in the mixed-reality environment.

Particular spatial mapping data is then identified (act 215). This "particular" data is for any virtual objects that were not included in the subset of virtual content (i.e. for those virtual objects that were filtered out). As a result of their not being included in the subset, these unincluded, discarded, unselected, or otherwise cast-aside virtual objects are identified as objects that are to be omitted from being projected.

Next, various different operations can be performed. For instance, in a first operation, the particular spatial mapping data (i.e. the data for those virtual objects that are not going to be projected) can be removed from the spatial mapping (act 220). It will be appreciated that this removal can be performed either during or before the mixed-reality system projects the virtual content. Furthermore, "removal" can mean different things. In some cases, removal can mean that the data is entirely deleted from the spatial mapping such that it is unrecoverable using only local data (the data may be stored remotely and recovered by remotely accessing that data, however). In other cases, removal means that the data is temporarily deleted from the spatial mapping, but it is stored in a temporary buffer and can be returned to the spatial mapping at some later time.

In a second operation, the particular spatial mapping data (i.e. the data for those virtual objects that are not going to be projected) can continue to be included in the spatial mapping, but can be precluded or otherwise restricted from actually being projected or used for projection (act 225). Similar to the above step, this step can also be performed either during or before projection. In this regard, the particular spatial mapping data is earmarked or otherwise flagged as data that should not be included in the projected mixed-reality environment. Accordingly, in some embodiments, determining attributes of a virtual object's tag includes identifying earmarked attributes. Then, based on these earmarked attributes (e.g., whether a virtual object has a particular type of earmarked attribute), some embodiments refrain from including the corresponding virtual object into the subset of virtual content that is to be projected (i.e. the virtual object is filtered out). It will also be appreciated that some embodiments are able to entirely prevent certain spatial mapping data from being included in the spatial mapping in the first place.

FIG. 3 shows yet another flowchart of an example method 300 for filtering virtual content from being projected into a mixed-reality environment. Initially, a spatial mapping of an environment is generated (act 305). Similar to that which was discussed earlier, generating this spatial mapping can be performed by including, in the mapping, spatial mapping data for actual physical objects located in the environment and/or for holograms that are placed/assigned to that environment. This spatial mapping data can include color data, texture data, or any other type of data mentioned thus far.

Subsequently, in act 310, a set of virtual objects is filtered in order to generate a subset of virtual objects. Then, certain spatial mapping data is included in the spatial mapping (act 315) (e.g., the data is not removed from the spatial mapping but instead is permitted to stay in the spatial mapping). The data that is included in the spatial mapping includes spatial mapping data for any virtual objects that were included in the subset of virtual content. In this regard, only the subset of virtual content will be viewable by a user while any remaining virtual content (i.e. virtual content that was prevented/refrained/filtered from being included in the spatial mapping) will not be projected such that it is not viewable by the user.

Accordingly, at a high level, the disclosed embodiments operate to selectively filter some virtual content from other virtual content. As will be further described below, this filtering process is dependent or otherwise takes into account certain filtering parameters. As such, the disclosed embodiments provide significant benefits with regard to how virtual content is projected for viewing.

Spatial Mappings, Holograms, and 3D Meshes

As described earlier, a "spatial mapping" refers to a digital representation or construct of an environment. In some scenarios, a spatial mapping may include, but is not limited to, any number of depth maps, 3D dot/point clouds, and/or a 3D mesh comprised of polygons (e.g., triangles). A triangular 3D mesh is comprised of many different triangles, where the collective combination of these triangles accurately represents the various features of all or some geometric surfaces in the environment. A 3D mesh may be generated for only a single object or for an entire environment or region. When the 3D mesh is of an entire region, then it can be thought of as a compilation of holograms or holographic information that describes "objects" as well as the different geometric surfaces of those objects (e.g., the walls, doors, tables, windows, etc.).

Other information may be included in the spatial mapping as well. For instance, some of the information that describes the environment and that is included in the spatial mapping may include planar information for any geometric planes in the environment. Additionally, or alternatively, some of the information may include volumetric information for any cubic areas in the environment. Additionally, some of the information in the spatial mapping may include information about holograms that are to be projected for viewing by a user. As described earlier, the spatial mapping may (at least initially) include information about all of the holograms that are placed/located within a particular region, even if all of those holograms will not be projected for viewing by a user (e.g., some might be filtered from being projected). Additionally, a spatial mapping can include information about virtual content, objects, and even commentary provided by any number of users who input or otherwise add such content, on an on-demand and/or dynamic basis, to the spatial mapping.

Figure 4B:
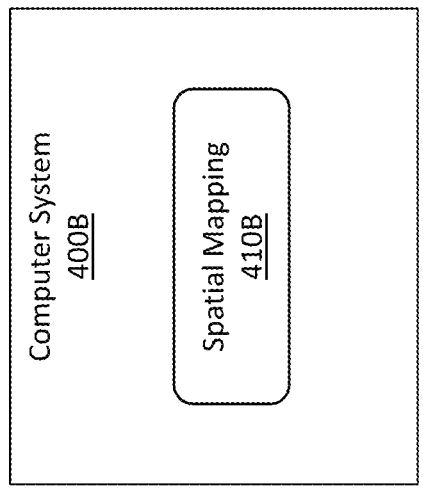
FIGS. 4A and 4B illustrate how a spatial mapping can be accessed from a remote location, or, alternatively (or additionally) from a local location.
Figure 4A:
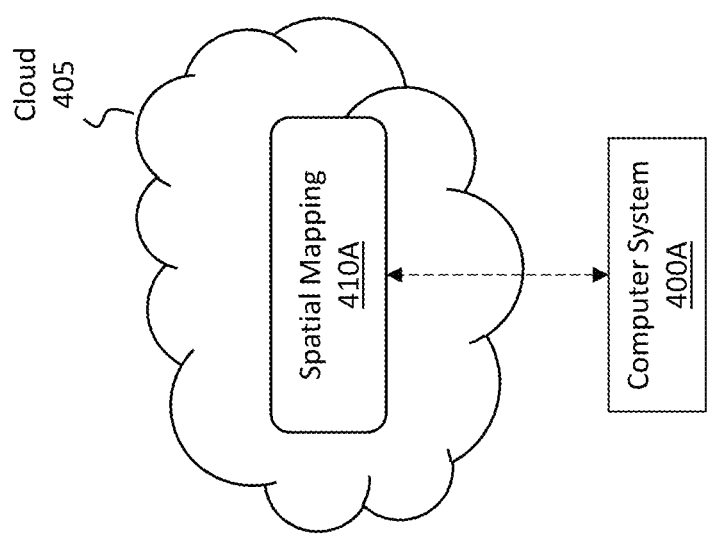

It will be appreciated that the spatial mapping can be stored in a cloud environment or on a local device. Combinations of the above are also available. FIG. 4A shows a computer system 400A that is able to communicate with a cloud environment 405 to access a spatial mapping 410A. In this situation, the spatial mapping 410A was previously generated by the computer system 400A (or by an entirely separate system), and the computer system 400A is simply obtaining access to that spatial mapping 410A, which is shared over a network connection between itself and the cloud environment 405.

In other scenarios, however, a computer system can be used to actually generate a spatial mapping and then store that spatial mapping locally or remotely. For instance, FIG. 4B shows an example computer system 400B capable of locally generating and storing a spatial mapping 410B. Of course, it will be appreciated that the computer system 400B, after generating the spatial mapping 410B, is able to upload or otherwise store the spatial mapping 410B in a cloud environment. Accordingly, the spatial mapping of the environment may be stored in a cloud environment, or, alternatively, the spatial mapping may be generated by a computer system that scans the environment and then stores the spatial mapping on the computer system such that the spatial mapping is accessed locally. It will be appreciated that the scanning process may utilize color texturing to describe (three-dimensionally) the objects in the environment. The scanning may be performed by imaging hardware incorporated into the HMD, such as one or more time of flight depth cameras, stereoscopic depth cameras, active stereo depth cameras, depth from motion imaging techniques, etc.

FIG. 5 shows one example implementation of a spatial mapping (e.g., the spatial mapping 410A or 410B from FIGS. 4A and 4B, respectively). In FIG. 5, the spatial mapping is in the form of a 3D mesh 500. As described earlier, 3D mesh 500 is comprised of any number of triangles 505 (or other polygons), which are organized in a manner so as to describe the contours and boundaries of an object. While FIG. 5 shows a 3D mesh describing only a single cubic object, it will be appreciated that a 3D mesh may also be used to describe an entire environment and any objects or fixtures within that environment and/or holograms that are to be projected into the environment.

Figure 6:
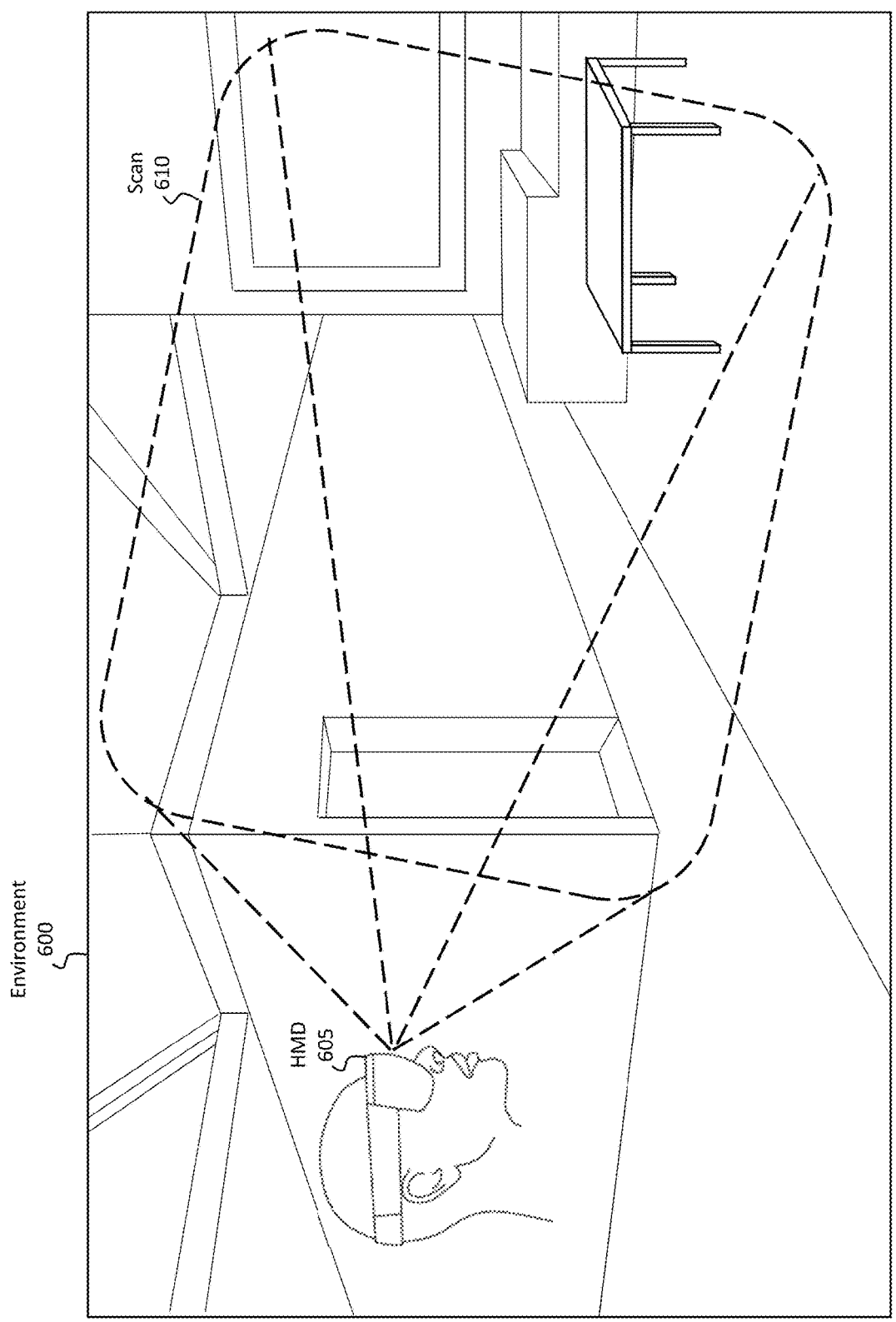
FIG. 6 illustrates a scanning operation in which an environment is scanned using one or more hardware scanners (e.g., time of flight depth cameras, stereoscopic depth cameras, active stereo depth cameras, depth from motion 3D imaging techniques, etc.) to scan an environment in order to generate a spatial mapping for that environment.

FIG. 6 shows a situation in which a HMD is generating a spatial mapping through use of its cameras (e.g., time of flight cameras, stereoscopic cameras, depth cameras, etc.). For instance, FIG. 6 shows an environment 600 that includes various different objects (e.g., the table, the door, the picture frame, etc.). Here, HMD 605 is being used to map environment 600 three-dimensionally via the scan 610. The result of this 3D mapping process is a spatial mapping, such as spatial mapping 410A or 410B from FIGS. 4A and 4B, respectively, comprising a virtual representation of the environment. It will be appreciated that the resulting spatial mapping of environment 600 may be uploaded to a cloud environment for persistent storage, for use by the scanning HMD 605 and/or another HMD that is rendering the virtual representation of the environment.

Figure 7:
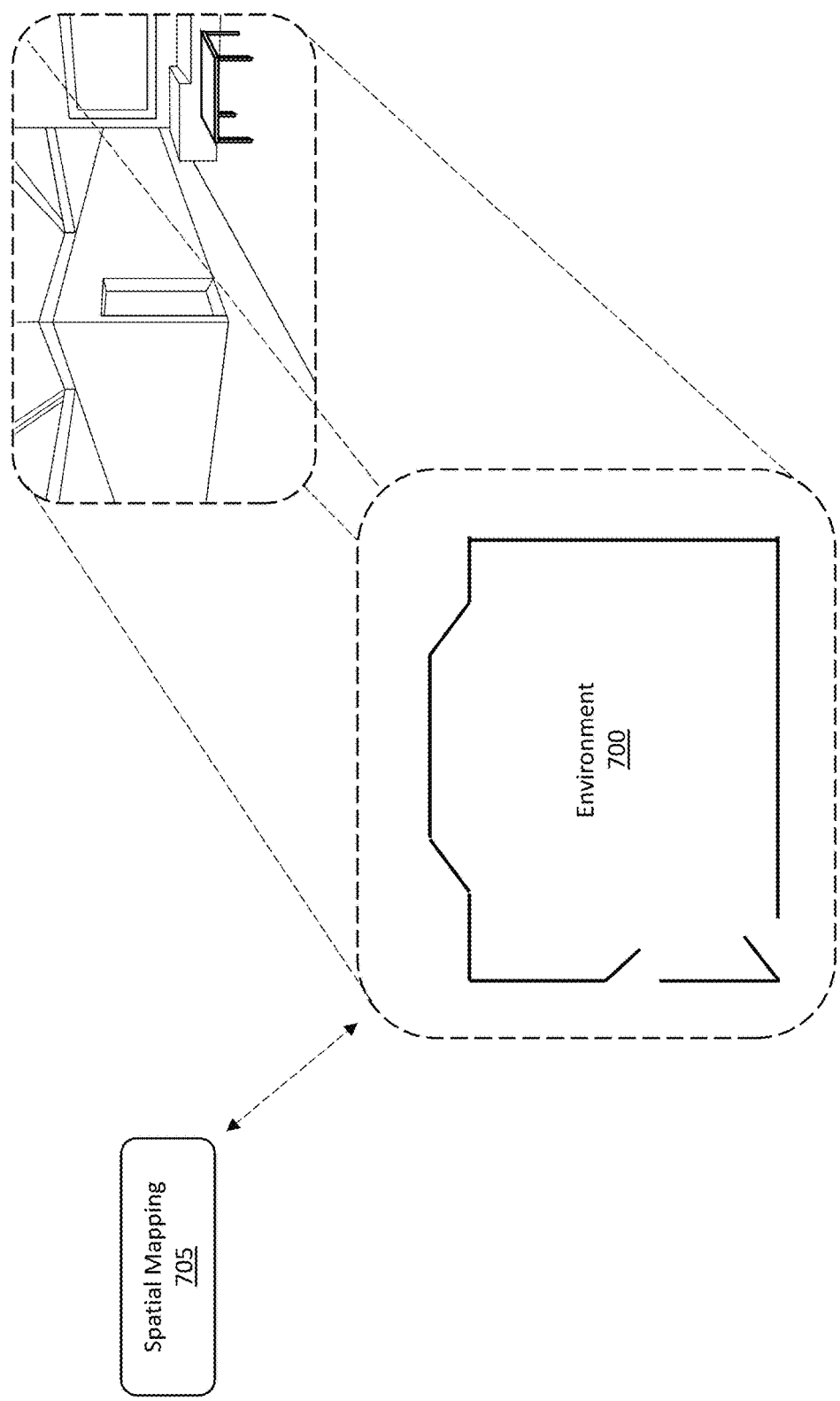
FIG. 7 provides another scenario in which an environment's spatial mapping is made available for use.

FIG. 7 shows a high-level view of an environment 700 that is similar to the environment 600 of FIG. 6. FIG. 7 also shows a spatial mapping 705 which comprises a 3D digital/virtual representation of environment 700. Accordingly, the disclosed embodiments are able to use a data acquisition system (e.g., a HMD with cameras) to collect information about an environment and to generate a spatial mapping for that environment. Alternatively, the embodiments are able to access an already-built spatial mapping of an environment when performing the disclosed operations.

Figure 8A:
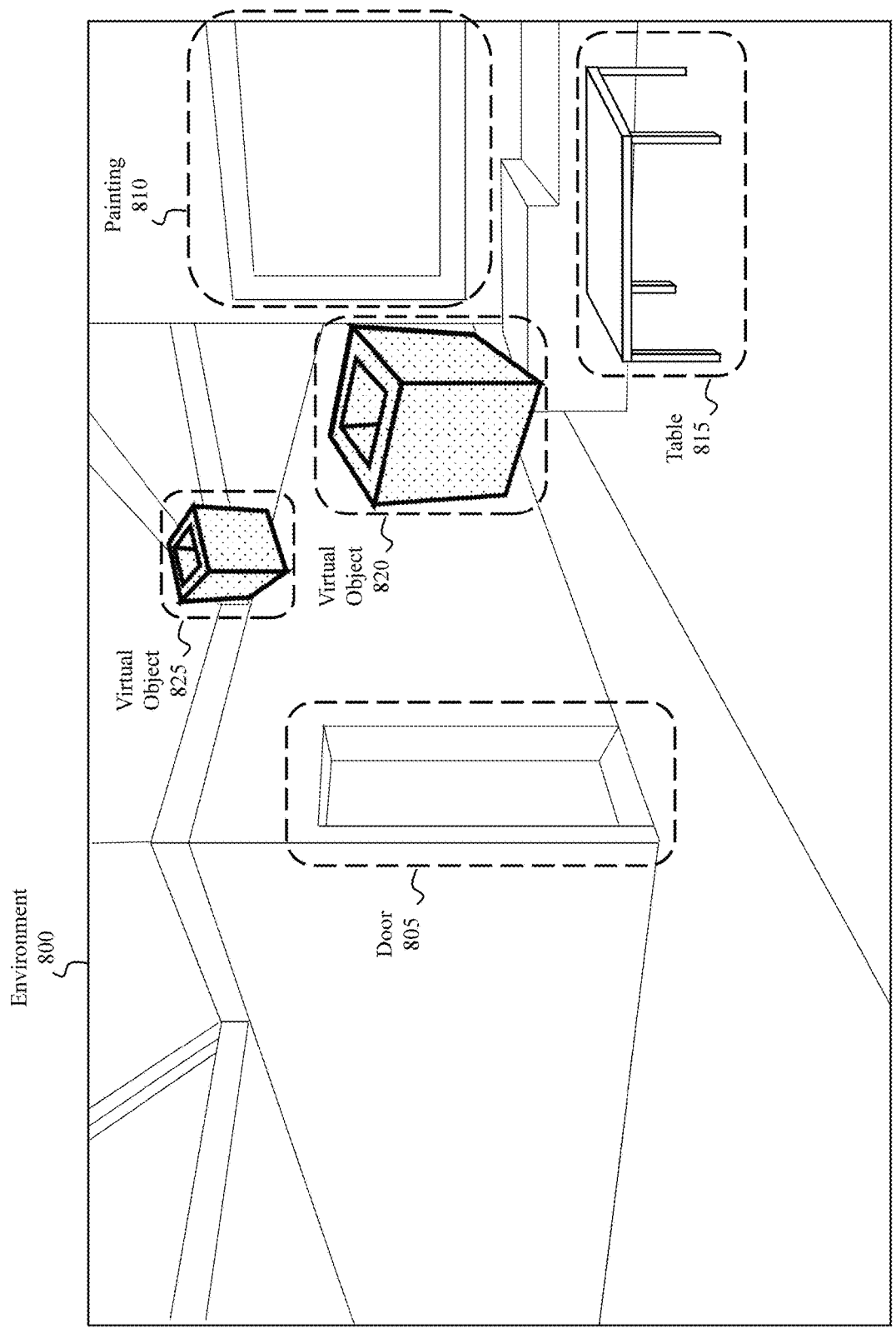
FIG. 8A illustrates how objects can be segmented from one another and how those objects' types can be identified in a mixed-reality presentation.

After generating the spatial mapping, objects associated with that environment can be identified. For example, FIG. 8A shows an environment 800 (e.g., a hallway environment) that is an example representation of environment 700 from FIG. 7. Objects included within the resulting spatial mapping are segmented. For instance, FIG. 8A shows a door object 805, a painting object 810, a table object 815, a first virtual object 820, and a second virtual object 825. The door object 805, painting object 810, and table object 815 correspond to real-world items while the first and second virtual objects 820 and 825 (i.e. holograms, holographic content, or virtual content) correspond to virtual objects. As shown, the disclosed embodiments are able to identify a type/classification for each of the objects. This may be achieved via machine learning or via any other segmentation technique.

Figure 8B:
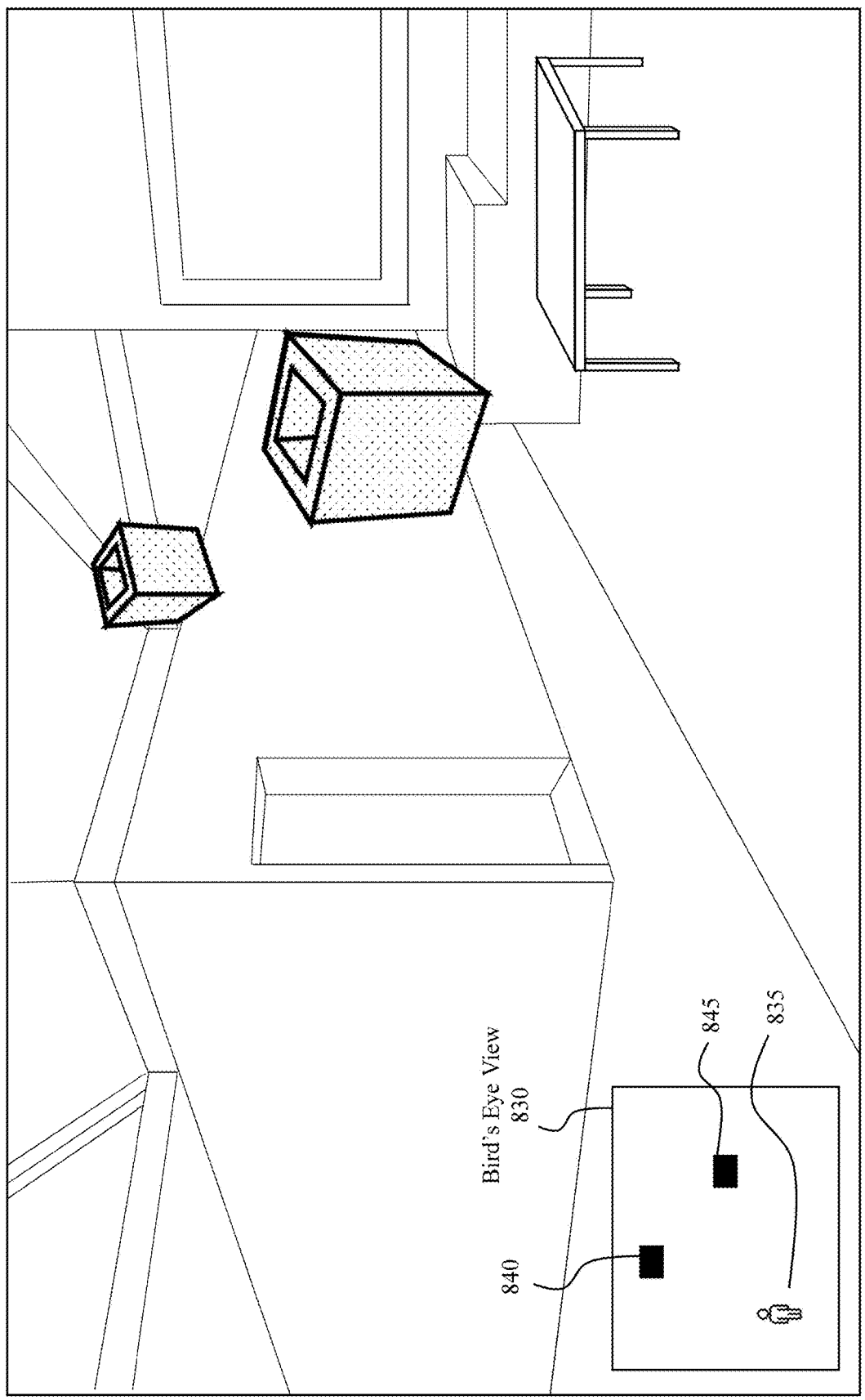
FIG. 8B illustrates a mixed-reality presentation corresponding to FIG. 8A and which includes a bird's eye view overlay.

In some embodiments, the virtual content that is selected for projection is additionally, or alternatively, displayed in a bird's eye view (e.g., from a top perspective), concurrently with a 3D presentation of the mixed-reality environment (e.g., such as in a separate frame that is rendered in an overlay of a portion of the mixed-reality environment), or in a separate interface that the user can toggle to by providing a toggle input (not currently shown). One example of a bird's eye view display 830 is shown in FIG. 8B, in which a user is reflected as element 835 and in which first and second virtual objects 820 and 825 from FIG. 8A are represented as elements 840 and 845, respectively. The bird's eye view display 830 can be thought of as a global display showing one, some, or all of the virtual objects (or even the mapped out real-world objects such as the door 805, the painting 810, and/or the table 815 in FIG. 8A) in relation to where the user is currently located. Such a feature may be beneficial in assisting the user in navigating the mixed-reality environment or to provide other types of enhanced interactive abilities.

Selectively Controlling Content Projected into a Mixed-Reality Environment

The disclosed embodiments are able to selectively control/filter the type of content that is projected in a mixed-reality environment or scene. To do so, some embodiments employ the use of an object tag, as shown in FIG. 9.

Figure 9:
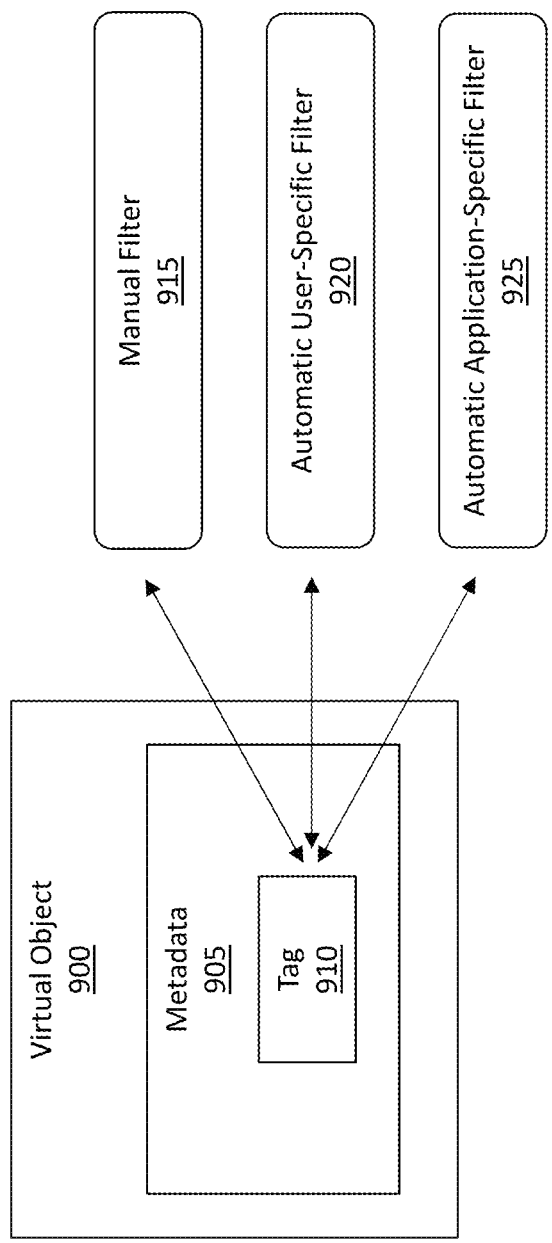
FIG. 9 illustrates how tags (e.g., metadata tags) can be used to flag data, which can then be filtered or otherwise refrained from being rendered using different filtering techniques.

FIG. 9 shows an example of a virtual object 900, which may be an example representation of the first or second virtual objects 820 and 825 from FIG. 8A. Here, virtual object 900 is shown as including metadata 905 and a tag 910 (which itself is metadata, such as a sub-part of the metadata 905). It will be appreciated that virtual object 900 is typically a composite collection or group of pixels that collectively embody an object (e.g., a dragon, laser gun, etc.). As such, metadata 905 can be associated with the entire collection of pixels forming the virtual object 900. Additionally, or alternatively, metadata 905 can be associated with specific pixels or subgroupings of pixels that form the virtual object 900. In this regard, a single virtual object (e.g., virtual object 900) can actually be associated with any number of different portions of metadata (e.g., metadata 905) and also, in some cases, be associated with any number of different tags (e.g., tag 910).

As previously noted, the tag may be stored with the metadata, as part of the virtual object's data structure. Alternatively, the tag may simply reference metadata and attribute information that is stored separately from the virtual object. A tag can be created either manually by a user or developer or automatically. Automatic techniques include, but are not limited to, semantic labeling of spatial mapped surfaces, object recognition using machine learning, or even comparison of virtual objects to a database of tagged models. In some embodiments, tags can also be associated with security attributes of the virtual objects. For instance, the tag can be compared to a user's identified characteristic to determine whether to grant or deny the user access to a particular mixed-reality scene, hologram, or other type of computing account.

An example of the tag/metadata will be helpful. Consider a hologram that includes many different layered regions. For example, consider a biology-themed hologram of a human. A first layer of the hologram can include the internal organs or other internal portions of the human (e.g., a skeleton, cardiovascular system, digestive system, etc.). This first layer may be wrapped by a second layer representative of nude skin. A third layer (e.g., clothing) can cover the second layer. Therefore, in this particular example, the hologram includes one or more layers. The hologram as a whole can be associated with "overall" metadata, and an "overall" tag can be included as a part of that "overall" metadata. Furthermore, in some cases, each sub-layer can be associated with a "layer" metadata, and a "layer" tag included as a part of each corresponding "layer" metadata.

In this regard, each hologram will have its own metadata, and a tag can also be embedded as a part of that metadata within each hologram data structure. The filtering process of selectively choosing which virtual content will be included in the subset of virtual content and which will be projected may be performed by incorporating virtual objects whose attributes (e.g., as determined by the tags) match a preselected attribute of interest (e.g., an attribute of the computer system, a user who is using the computer system, another circumstantial feature, etc.) and where the match satisfies the filtering parameters. Stated differently, "matching" refers to identifying situations where the relationship between an attribute of interest and a hologram's tag satisfies the specified filtering parameter. Accordingly, the process of selecting the subset of virtual objects to present will also include an act of identifying attributes of the user and/or user device and/or other circumstantial attributes (e.g., time of day, location, etc.).

The disclosed embodiments are able to impose or utilize different filtering techniques when determining what virtual content will be viewable by a user. FIG. 9 shows three different example filtering techniques. It will be appreciated that while only three are shown, the embodiments may use any number of different filtering techniques.

As shown, a manual filter 915, an automatic user-specific filter 920, and/or an automatic application-specific filter 925 may be used to specify which user, device, or circumstantial attributes will be applied for finding matching tags/metadata of virtual objects to select for display or to filter from display. Of course, any one or any combination of these filtering techniques may be used as well.

In some instances, the manual filter 915 relates to a filtering process where a human selectively labels/identifies one or more user, device, or circumstantial attribute(s), sometimes referred to as filtering parameters, that will be used to find virtual objects having matching tags/metadata to be displayed and/or to be filtered from being displayed from the spatial mapping within the mixed-reality environment. As an example, a mother may input a filtering parameter specifying that her 7 year old child is not to view or interact with holograms that are tagged as being appropriate only for mature users (e.g., 17 and older). As such, the mother can enter input into a HMD specifying the filtering parameter in order to automatically filter from view all holograms tagged as being mature-only. In this regard, a human user is able to enter (as input) any number of filtering parameters and cause those filtering parameters to be implemented by a HMD when determining which virtual objects/holograms will be made viewable. As another example, consider a home environment that includes a 17 year old child and the 7 year old child mentioned above. Placed within that home environment may be any number of holograms, some geared for all users and some geared only for mature users. By specifying the above-recited filtering parameter, the mature holograms can be filtered from being projected for view by the 7 year old, even though those mature holograms are still located within the home environment (i.e. the 7 year old simply will not be able to see them even though they are present) while they are available for viewing by the 17 year old child.

In some instances, the automatic user-specific filter 920 relates to a filtering process where user profile attributes (e.g., previously specified or detected interests) are used by an artificial intelligence module to specify filtering parameters (i.e., user, device, or circumstantial attribute(s)) that will be used to find virtual objects having matching tags/metadata to be displayed and/or to be filtered from being displayed from the spatial mapping within the mixed-reality environment and without requiring a user to explicitly specify the filtering parameters. For example, the artificial intelligence module may be a locally-stored module or a cloud-based module. Regardless of where it is stored or where it operates, the artificial intelligence module is able to analyze any type of data, such as, but not limited to, user social media profiles, navigation histories, shopping preferences, location data, a user's biometric data (e.g., a heart rate), constraints of a display or rendering capabilities of the HMD, or any other type of information. For example, some holograms may not be capable of being rendered on certain devices (due to resolution). Such a constraint can be specified in the tagged metadata. Likewise, in some instances, the system can provide filtering parameters that specify the display capabilities of the device (a circumstantial attribute), such that the appropriate holograms will be selected for display or be omitted from display based on determining a match or a lack of match between the tagged metadata and the filtering parameters.

As an example, consider a scenario where an older user is playing a zombie apocalypse game in which scary zombie holograms are being projected for the user to interact with. With the proper hardware (e.g., a heartrate monitor), the artificial intelligence module is able to proactively monitor the vitals and biometrics of the older user while the user is playing the game. If the artificial intelligence module determines that the older user's heartrate is beyond an acceptable threshold, then the artificial intelligence module may interfere or otherwise independently cause the zombie game to reduce the scariness of the game by playing at a lower intensity level, by omitting the 'more scary' holograms or selecting 'less scary' holograms for display, rather than the 'more' scary/graphic holograms, based on tagging of the holograms that match different circumstantial filtering parameters (e.g., the user heart rate). As such, a cloud-based (or local) module can be used to automatically ascertain user attributes, device attributes, or other circumstantial attributes and automatically perform filtering based on filtering parameters, such as is shown by automatic user-specific filter 920 in FIG. 9.

Automatic application-specific filter 925 relates to a filtering process where an application (e.g., a mixed-reality application (e.g., the zombie game itself) that is causing virtual content to be projected) specifies predefined filtering parameters (i.e., user, device or circumstantial attribute(s)) that will be used to find virtual objects having matching tags/metadata to be displayed and/or to be filtered from being displayed from the spatial mapping within the mixed-reality environment. For example, an application may specify that the application is suitable for users of a particular age. In this situation, the particular age is used as a filtering parameter. With reference to the above example, instead of an independent artificial intelligence module instigating the filtering process, the zombie game itself can invoke filtering to thereby reduce the stress placed on the older user. As such, a mixed-reality application can also include an artificial intelligence module to determine how and when to filter content.

Another example will be helpful. Using the human anatomy hologram example discussed earlier, the filtering parameters can be used to determine whether the first layer, second layer, and/or third layer of the hologram will be available for view by a user. For instance, if the user is a young child and/or the hologram is viewed outside of a classroom environment, then the parameters can be configured in such a manner so that only a fully clothed human is viewable as the hologram, as opposed to the human's internal body parts or even nude body parts. Alternatively, if the user is a college-aged biology student and/or the hologram is viewed in a classroom environment, then the parameters can be configured in such a manner so that the user can view and interact with any of the holographic layers.

It will be appreciated that the disclosed embodiments provide great benefits by carefully controlling the amount and type of content that is available for viewing. These benefits may be realized, at least in part, through the use of tagged metadata with the holograms that are rendered and/or that are omitted from being rendered.

Figure 10:
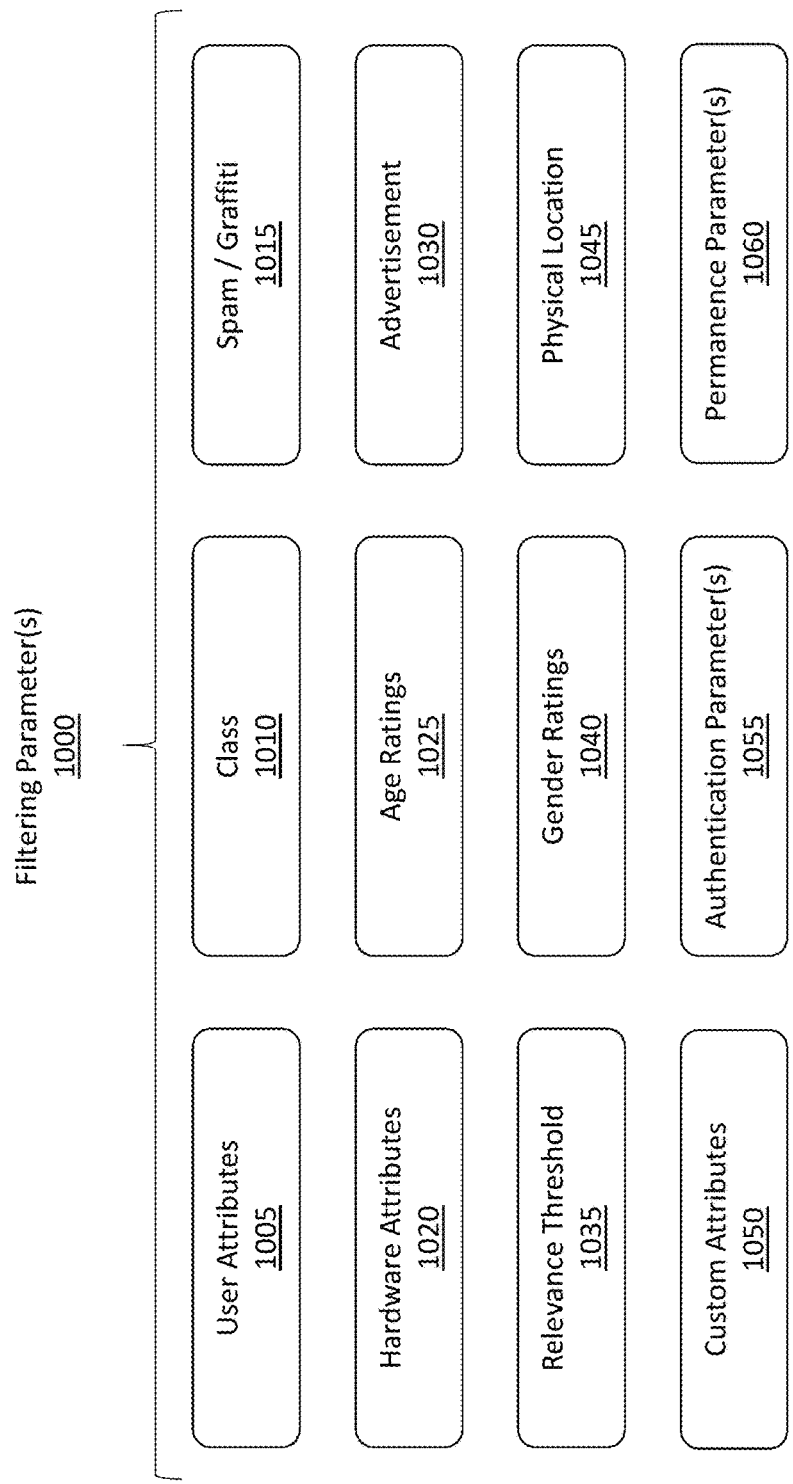
FIG. 10 illustrates different filtering parameters that may be considered when determining whether to filter virtual content.

Attention will now turn to FIG. 10, which shows some nonlimiting examples of potential filtering parameters 1000 that may be considered or used in selectively controlling what virtual content will be projected.

One parameter is user attributes 1005. User attributes 1005 can be any characteristic about a user who is using the mixed-reality system. Examples of user attributes 1005 include, but are not limited to, any one or combination of the following: age, gender, height, weight, ethnicity, geo-political background, income level, education level, social media preferences, hobbies, shopping history, profession, user specific data, or any other recognizable feature of a person. As described earlier, it may not be appropriate to project a hologram of internal organs to a young child, but it may be perfectly appropriate to project that hologram to a medical or biology student.

As an example, consider a scenario where a particular virtual object is tagged as being usable or suitable only for users who have a particular educational background (e.g., the virtual object is a hologram of a complex electrical circuit such that only electrical engineers would have an interest in or understanding of the hologram). Furthermore, this hologram may be located in a classroom environment. In this scenario, it is highly unlikely that a young child, who may have wandered into the classroom, would be interested in such a hologram. As such, the child's mixed-reality system can invoke an educational background parameter in order to filter out this type of hologram (e.g., by invoking the educational background filter parameter and then applying a filter so as to remove this hologram from being projected to the young child). Based on this, it will be appreciated that different users may view and interact with different holograms or portions of holograms, even if those users are physically located within the same environment or public space.

Another parameter is a class 1010. Class 1010 relates to a general category that the hologram may fall within. Example classes include, but are not limited to, adult content, youth content, child content, financial content, employment content, recreational content, or any other distinct type of class that a hologram can generally fall within.

Spam/graffiti 1015 is a parameter that can be used to tag, earmark, and/or filter virtual content that is likely to be considered as holographic spam or holographic graffiti. Some users may not be interested in viewing this kind of content, and they can use this filtering parameter to remove holograms having this kind of tag. As such, it will be appreciated that some of the disclosed embodiments are able to prevent unwanted user contributions (e.g., spam) to a particular user's mixed-reality environment.

Additionally, some embodiments monitor one or more usage patterns of spammers when tagging content as spam/graffiti. For instance, some of the embodiments tag a hologram as spam by intelligently identifying when a hologram has been placed in a seemingly random or obscure location. Relatedly, some embodiments tag a hologram as spam based on the characteristics of the user who created or last modified the hologram (e.g., the author). As an example, if the author was previously or is currently banned, restricted, or otherwise identified as a spammer, then the embodiments may base their determinations on whether a particular hologram is spam based on the status of the hologram's author. Some embodiments also detect machine-fabricated holograms. For instance, fully automatic hologram placement scripts might be used to vandalize large parts of the mixed-reality world/environment/scene. Some embodiments are able to dynamically identify such occurrences and clean up the mixed-reality environment and/or omit the vandalization holograms from appearing if they do not contain proper tagging that matches the filtering parameters of holograms to be displayed. Of course, it will be appreciated that a human user can also review or be consulted by a machine learning algorithm during these decision processes.

Hardware attributes 1020 relate to the specific hardware features of the mixed-reality system. These attributes include, for example, the graphics processing unit's (GPU) capabilities, the CPU's capabilities, the rendering/projection capabilities (e.g., the resolution), the memory constraints, the battery lifespan, or any other hardware (or even software) feature of the mixed-reality system. In some instances, content that might be projectable on one device may not be projectable on another device as a result of the different resolution or rendering capabilities between those two devices. In this manner, some virtual content may be purposely prevented from being included in a mixed-reality environment, or, alternatively, may be purposely included in a mixed-reality environment based on the hardware attributes of the underlying mixed-reality system.

Age rating 1025 is similar to user attributes 1005, but focuses more specifically on the age of the user who is currently using the mixed-reality system. In some embodiments, different age ratings may be imposed on a hologram. These age ratings can correlate to the age ratings used in video gaming (e.g., "E" for "everyone," "M" for "mature," etc.), or they may correspond to the age ratings used for motion pictures (e.g., "G" for "general," "PG" for "parental guidance," etc.). Additionally, or alternatively, other types of age-based ratings may be used (e.g., appropriate only for users 7 years and older, etc.). As such, some tags may include information specifying an age appropriate rating or any other type of user specific data. When the filtering process is performed, the embodiments are able to extract, from the tags, the age appropriate rating, the user specific data, or any of the other information included within the tags in order to determine whether to actually filter the hologram from being projected.

Advertisements 1030, which is somewhat similar to the spam/graffiti 1015 parameter, relates to a parameter that can be selected to include or prevent advertisement-type holograms or other types of solicitous holograms from being projected to a user. As the 3D virtual space is becoming more and more popular, advertisement companies are finding ways to inject advertisements into mixed-reality environments. As such, the advertisements 1030 parameter can be selected to filter out any virtual objects that have been tagged as being an advertisement. Stated differently, this parameter can be used as a sort of ad blocker.

Relevance threshold 1035 can incorporate or be associated with a number of different factors. For instance, each tag can include an indicator stating a degree, probability, or estimated likelihood that a particular hologram may be of interest to the current user. As an example, consider a scenario in which a friendly dinosaur hologram is available for projection. In this scenario, the relevance of this hologram for a young child may be high (or at least higher) than the relevance of this hologram for an adult. Specifically, the young child may be very interested in viewing and interacting with a friendly dinosaur whereas an adult may have little to no interest in viewing and interacting with a friendly dinosaur.

It will be appreciated that various different machine learning techniques or algorithms may be adopted or invoked when tagging a virtual object with a relevance criteria. For instance, the machine learning algorithm can determine the current user's attributes (e.g., age, interests, etc.) and estimate/gauge a potential likelihood that a particular hologram is relevant (i.e. may be of interest to) the user. This estimation degree, probability, or metric can then be included in the tag. Thereafter, the relevance threshold 1035 can be adjusted so that only virtual objects whose relevance value at least satisfies or surpasses the designated relevance threshold 1035 will be projected and be viewable by the user. Of course, the relevance threshold 1035 can be set via a sliding scale, an assigned value, or some other indicator (e.g., "A" relevance, "B" relevance, etc.) to indicate the potential relevance to a user.

Consequently, some embodiments generate the subset of virtual content (which is to be projected) by filtering out virtual objects that fail to satisfy a relevance threshold. Furthermore, determining whether a particular virtual object satisfies the relevance threshold may be based, at least in part, on an identified characteristic of a user who is using the computer system (e.g., any of the user attributes discussed earlier) and/or of the computer system itself (e.g., its rendering capabilities).

Gender ratings 1040 can be used to indicate that some virtual objects may be more suited or geared towards a particular gender than towards another gender. For example, some pregnancy holograms may (but not necessarily) be more oriented for females.

Physical location 1045 can also be considered. For instance, some holograms can be designed to continuously follow a user from one location to another. Some embodiments, however, restrict the locations where that hologram can follow a person. As an example, consider a scenario where a hologram represents a live video feed of the user, where the user is communicating with any number of other individuals. That live video feed can continuously follow the user as the user moves from one location to another, thereby allowing the conversations between the users to continue regardless of where any of the individual users move. In some situations, however, the user may desire privacy. For instance, the user probably does not want a live video feed of the user while the user is in a bathroom. As such, physical location 1045 parameter can be used to cease or otherwise filter out a virtual object/hologram based on the user's current physical location (e.g., one, some, or all holograms can cease to be projected upon the user entering a bathroom, bedroom, or other private or confidential area (e.g., a secure room or business meeting)).

Instead of simply terminating the hologram, other operations can be performed as well. For instance, sound can be muted, the video transmission can cease but sound remain, the video transmission showing the other users can continue while the video transmission showing the user ceases (such that the user can see the other users but the other users cannot see the user), or the hologram (e.g., the sound and video transmissions) can simply be paused for a period of time. It will be appreciated that these operations may be based on the user's current location and can be invoked based on the user's preference. For example, while in a bathroom, the user may continue to view the video and sound transmission showing the other users while his/her own video and sound transmission is temporarily paused, thereby allowing the user to continue to see and hear the conversations while maintaining his/her own privacy while in the bathroom. Of course, this is only one type of example, and the broader principles should be considered. Furthermore, these filtering operations may occur automatically and may be triggered in response to any detected condition (e.g., the user entering a bathroom or private environment, or even the user starting to perform a type of action that is considered private).

Custom attributes 1050 provide the user with the ability to set or establish any number of other parameters, based on the user's specific desires or specifications. As such, the disclosed embodiments provide a highly flexible methodology for controlling the type of content that is projected. It will also be appreciated that a user is able to adjust any of the parameters discussed herein. Therefore, in some embodiments, a tag can be configured to enable flagging for content that is determined to be unsuitable for a particular type of user via use of the customizability of these tags.

Another parameter is the authentication parameter(s) 1055. In some situations, it may be desirable to project a virtual object only if the user (or computing device) has sufficient authority to access that virtual object. For example, consider a scenario of a business meeting where multiple users are using their mixed-reality systems to engage with one another in a business deal or transaction. Here, it is probably highly advantageous to restrict which users can be included in the meeting so that only authorized users can see, hear, and/or interact during the meeting. As such, a hologram can be tagged so that only authorized personnel can view and interact with the business-themed hologram. Different authentication techniques may be used. For instance, some implementations use username and password combinations, some use GPS coordinates, some use scene matching, some use authenticity tags or certificates, some use biometric information (e.g., fingerprint, eye scan, etc.), and some use relevance with other user captures for authentication purposes (e.g., does the user's current mixed-reality scene coincide or relate to another user's current mixed-reality scene). As such, authentication information can be included in a virtual object's tag, and the filtering mechanism can be influenced by the authentication information.

Another attribute is a permanence parameter 1060. Some spatial mapping data may relate to objects that are transient or mobile in some form. As such, some of the embodiments are able to tag an object (either a real-world object or a virtual object) as being transitory using the permanence parameter 1060. Example parameters of this type may include, but are not limited to, low permanence (meaning highly transitory), somewhat permanent, and high permanence. As an example, some of the actual physical objects located within the environment may include objects with a determined degree of permanence (e.g., a bed is probably considered to have a high permanence while a swivel chair is probably considered to have a low permanence). The spatial mapping can also be adjusted based on this permanence parameter. To illustrate, spatial mapping data for actual physical objects whose determined degree of permanence falls below a threshold permanence level can be filtered out of the spatial mapping. Accordingly, by specifying certain parameters, the embodiments are able to selectively control the projection of virtual content. It will be appreciated that any one or combination of the above parameters may be used as well. Furthermore, while the filtering parameters 1000 included only a few parameters, it will be appreciated that any number of other parameters may be considered.

It will also be appreciated that individual users (or even computer systems) are able to independently tag particular virtual objects in different manners. For instance, if a user, while interacting with a particular hologram, determines that the hologram is probably not appropriate for a particular class or type of user (e.g., a young child), then the user can flag or tag the hologram. The embodiments are able to maintain a database or other type of repository for flagged content and can use the database to determine the suitability or appropriateness of future-generated content by comparing and contrasting the attributes of the flagged content with the future-generated content. Additionally, if a virtual object is missing a tag or even a particular type of tag, then some embodiments can refrain from including that virtual object in the subset of virtual objects that are selected for projection (i.e. filter those virtual objects out).

Figure 11:
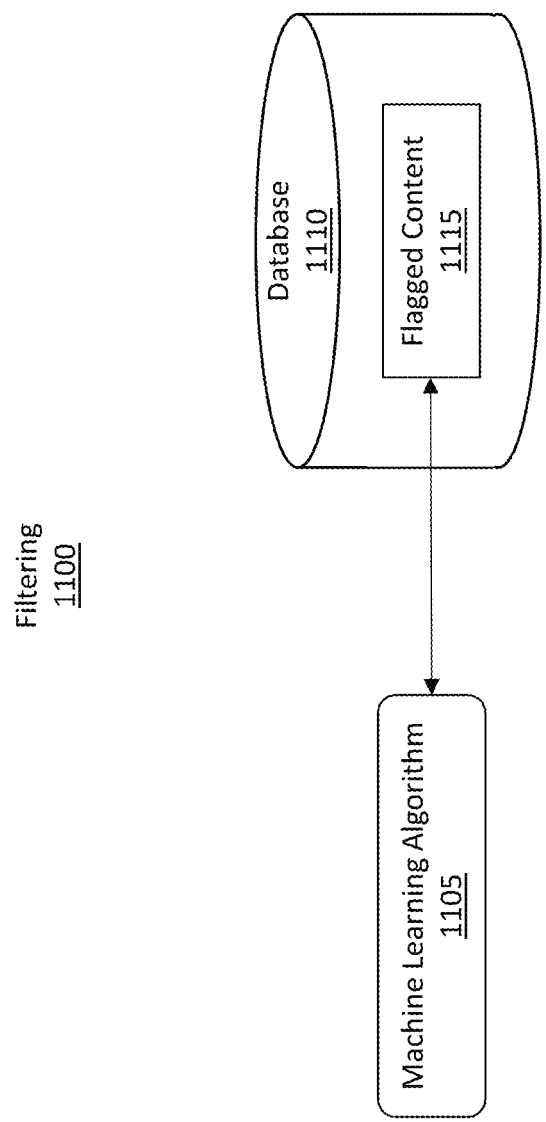
FIG. 11 illustrates another technique for filtering virtual content through the use of a machine learning algorithm or other type of artificial intelligence.

FIG. 11 shows a filtering 1100 technique where a machine learning algorithm 1105 is being used in conjunction with a database 1110, which is an example implementation of the database described above. For instance, database 1110 includes flagged content 1115 which has been previously flagged by users and/or systems in some manner. In some cases, the flagged content 1115 is used simply as informative information regarding a determined type of a particular hologram (e.g., the hologram may be an engineering hologram) while in other cases the flagged content 1115 is used to notify others that a particular hologram is not appropriate for some users. Of course, the database 1110 can be used to store any type or combination of data. Furthermore, database 1110 can be located in a cloud environment such that database 1110 is widely accessible to any number of computing systems (e.g., a "community" database). In this regard, database 1110 can be considered as a central warehouse for storing and maintaining information about different virtual objects/holograms. Additionally, some or all of the database 1110 may be stored locally.

In some embodiments, the machine learning algorithm 1105 is able to periodically or on-demand check/query against database 1110 to determine whether a particular hologram has been flagged. If the exact hologram is not included in the database 1110, then the embodiments are able to determine whether the particular hologram is sufficiently similar or related to a flagged hologram in the database 1110. Determining whether one hologram is similar to another hologram can be performed in a variety of ways.

To illustrate, the attributes of a first hologram (as determined by the metadata and/or tags) can be compared and contrasted against the attributes of a second hologram, which is stored or otherwise indicated as being a flagged hologram in the database 1110. If a threshold number of attributes from the first hologram align or coincide with attributes from the second hologram, then it can be determined that the two holograms are related or similar. As such, if the threshold number of similar attributes is satisfied, then the spatial mapping data for the first hologram can be removed from the spatial mapping. Stated differently, some embodiments cause the machine learning algorithm 1105 to check the database 1110 of flagged content 1115 to determine whether any virtual objects that are currently being examined by the machine learning algorithm 1105 share a relationship with the flagged content 1115. If so, then the data for those virtual objects can be removed from the spatial mapping because those virtual objects are determined to be undesirable in the current context.

Accordingly, significant advantages may be realized by practicing the disclosed principles. For instance, any number of virtual content/holograms may initially be located within a particular environment. Some of the disclosed embodiments beneficially filter which virtual content will be displayable for a user to view based on a selected filtering parameter and a result of a comparison between the parameter, the holograms' tags, a selected attribute (e.g., a user attribute, device attribute, or other circumstantial attribute). This filtering process may be performed by associating a tag with a hologram as whole, or with a particular portion or layer of the hologram. By querying these tags as well as invoking filtering parameters, the disclosed embodiments are able to control the type of content that a user can view and interact with. This process may beneficially, in some embodiments, be performed on the fly and dynamically in response to detected changes in the circumstances associated with different filtering parameters (e.g., by detecting a change in a user or user attribute, a change in location, device use, time, proximity to particular objects, context, and/or any other filtering parameter).

Example Computer System

Figure 12:
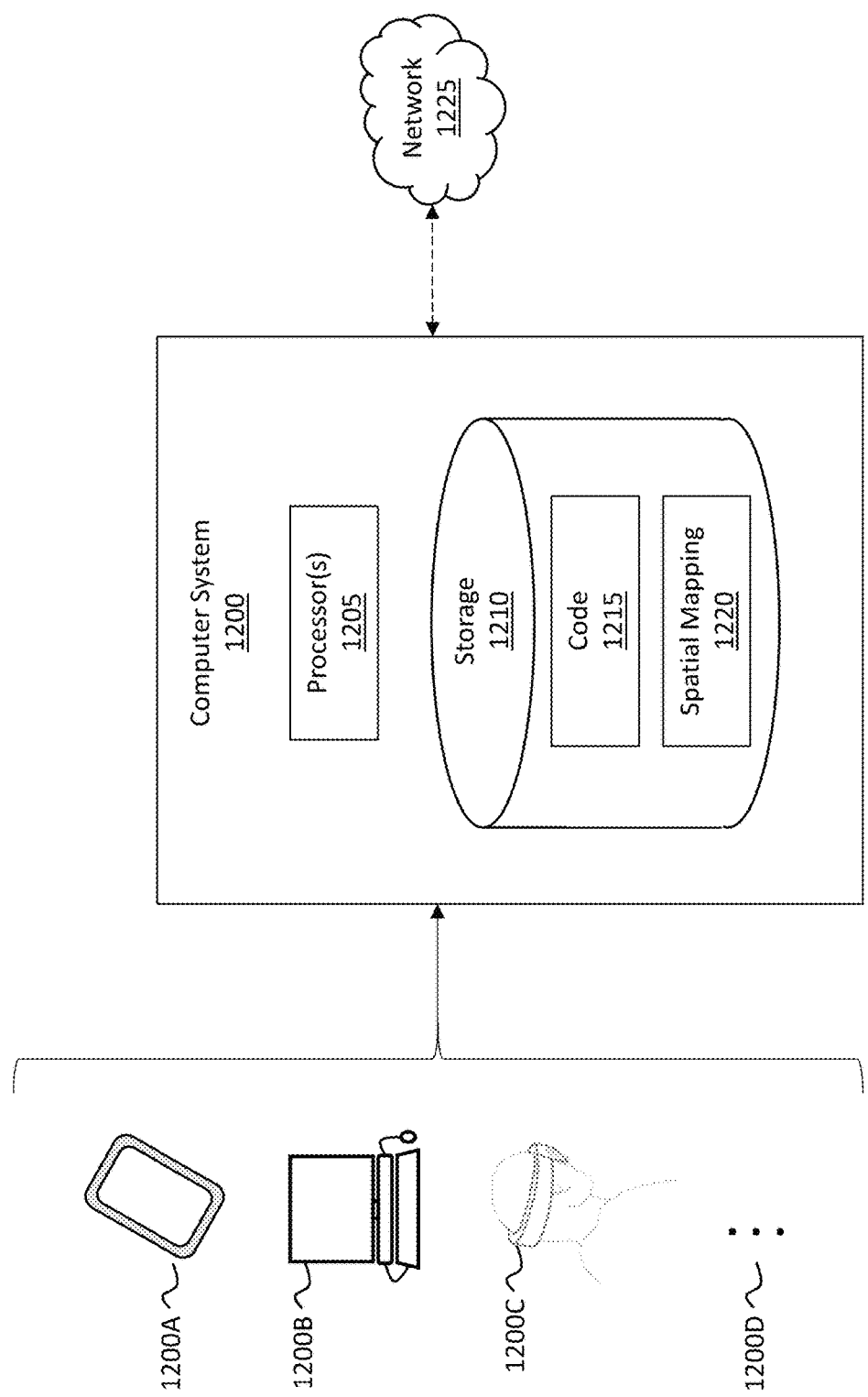
FIG. 12 shows an example computer system that is capable of performing the operations described herein.

Attention will now be directed to FIG. 12 which illustrates an example computer system 1200 that may be used to facilitate the operations described herein. In particular, this computer system 1200 may be in the form of the HMDs that were described earlier.

In fact, computer system 1200 may take various different forms. For example, in FIG. 12, computer system 1200 may be embodied as a tablet 1200A, a desktop 1200B, or a HMD 1200C. The ellipsis 1200D demonstrates that computer system 1200 may be embodied in any form. For example, computer system 1200 may also be a distributed system that includes one or more connected computing components/devices that are in communication with computer system 1200, a laptop computer, a mobile phone, a server, a data center, and/or any other computer system. The ellipsis 1200D also indicate that other system subcomponents may be included or attached with the computer system 1200, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of circumstantial filtering parameters used during application of the disclosed embodiments.

In its most basic configuration, computer system 1200 includes various different components. For example, FIG. 12 shows that computer system 1200 includes at least one processor 1205 (aka a "hardware processing unit") and storage 1210. Processor 1205 may be configured to perform any of the operations discussed herein. Storage 1210 is shown as including executable code/instructions 1215 and a spatial mapping 1220 (such as any of the spatial mappings discussed herein).

Storage 1210 may be physical system memory, which may be volatile, non-volatile, or some combination of the two. The term "memory" may also be used herein to refer to non-volatile mass storage such as physical storage media. If computer system 1200 is distributed, the processing, memory, and/or storage capability may be distributed as well. As used herein, the term "executable module," "executable component," or even "component" can refer to software objects, routines, or methods that may be executed on computer system 1200. The different components, modules, engines, and services described herein may be implemented as objects or processors that execute on computer system 1200 (e.g. as separate threads).

The disclosed embodiments may comprise or utilize a special-purpose or general-purpose computer including computer hardware, such as, for example, one or more processors (such as processor 1205) and system memory (such as storage 1210), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras, accelerometers, gyroscopes, acoustic sensors, magnetometers, etc.). Further, computer system 1200 may also be connected through one or more wired or wireless networks 1225 to remote systems(s) that are configured to perform any of the processing described with regard to computer system 1200.

During use, a user of computer system 1200 is able to perceive information (e.g., a mixed-reality environment) through a display screen that is included among any I/O interface(s) of computer system 1200 and that is visible to the user. The I/O interface(s) and sensors also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

A graphics rendering engine may also be configured, with processor 1205, to render one or more virtual objects within a mixed-reality scene/environment. As a result, the virtual objects accurately move in response to a movement of the user and/or in response to user input as the user interacts within the virtual scene.

A "network," like the network 1225 shown in FIG. 12, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1225. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1205). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable hardware storage devices having stored thereon computer-executable instructions that are executable by the one or more processors to configure the computer system to:
access a spatial mapping of an environment, wherein the spatial mapping includes information describing the environment three-dimensionally;
based on an analysis that includes an examination of the spatial mapping, identify segmented objects that are associated with the spatial mapping, the segmented objects corresponding (1) to actual physical objects located within the environment and/or (2) to virtual objects that are selected for potential projection into a mixed-reality environment;
for each of at least some of the segmented objects, which are selected for potential projection into the mixed-reality environment, access a corresponding tag that is associated with each of the at least some of the segmented objects, wherein at least one of the corresponding tags is associated with a particular virtual object based on tagging input directed to the particular virtual object and provided by one or more users interacting with the particular virtual object within the environment, the tagging input provided by the one or more users interacting with the particular virtual object within the environment being operable to trigger automatic modification or creation of metadata for the particular virtual object such that the metadata modified or created in response to the tagging input provided by the one or more users interacting with the particular virtual object within the environment tags the particular virtual object as including content determined to be unsuitable for a particular type of user by the one or more users interacting with the particular virtual object within the environment and is operable to cause one or more systems operating within the environment to subsequently refrain from displaying the particular virtual object into the environment;
generate a subset of virtual content that is selectively chosen from the at least some of the segmented objects and that is selectively chosen based on one or more determined attributes of each of the corresponding tags, the subset of virtual content being content that is selected for actual projection into the mixed-reality environment; and
project into the mixed-reality environment and/or schedule for projection into the mixed-reality environment the virtual content included within the subset of virtual content.

2. The computer system of claim 1, wherein selectively choosing the virtual content that is included within the subset of virtual content is performed by filtering the at least some of the segmented objects, the filtering being at least one of:
a manual filtering performed by a user of the computer system,
an automatically generated filtering based on one or more user-specific filters, or an automatically generated filtering based on one or more application-specific filters.

3. The computer system of claim 1, wherein:
selectively choosing the virtual content that is included within the subset of virtual content is performed by incorporating segmented objects whose determined one or more attributes match an attribute of either the computer system or a user who is using the computer system.

4. The computer system of claim 1, wherein generating the subset of virtual content is performed by filtering out segmented objects that fail to satisfy a relevance threshold, and wherein determining whether a particular virtual object satisfies the relevance threshold is based on an identified characteristic of a user who is using the computer system.

5. The computer system of claim 1, wherein generating the subset of virtual content is performed by filtering out segmented objects that fail to satisfy a relevance threshold, and wherein determining whether a particular virtual object satisfies the relevance threshold is based on an identified characteristic of the computer system.

6. The computer system of claim 1, wherein the one or more determined attributes of each of the corresponding tags includes an identified class such that generating the subset of virtual content is based on the identified class.

7. The computer system of claim 1, wherein each of the corresponding tags includes information specifying an age appropriate rating, or, alternatively, each of the corresponding tags is correlated with user specific data.

8. The computer system of claim 7, wherein determining the one or more attributes of each of the corresponding tags includes extracting the age appropriate rating and/or the user specific data from each of the corresponding tags.

9. The computer system of claim 1, wherein generating the subset of virtual content is also based on at least one of: a physical location of the computer system, a hardware attribute of the computer system, or a manually selected filter parameter.

10. The computer system of claim 1, wherein each of the corresponding tags includes an authentication parameter, and wherein generating the subset of virtual content is based, at least in part, on the authentication parameter included in each of the corresponding tags.

11. The computer system of claim 1, wherein the virtual content included in the subset of virtual content is additionally displayed from a bird's eye view, and wherein displaying the virtual content from the bird's eye view includes displaying the virtual content on either a two-dimensional screen or within the mixed-reality environment.

12. The computer system of claim 1, wherein determining the one or more determined attributes of each of the corresponding tags includes identifying an earmarked attribute from within each of the corresponding tags, and wherein any segmented objects having a particular type of earmarked attribute are refrained from being included in the subset of virtual content.

13. The computer system of claim 1, wherein generating the subset of virtual content is performed by causing a machine learning algorithm to check a database of flagged content to determine whether any of the at least some of the segmented objects shares a relationship with the flagged content in the database.

14. The computer system of claim 1, wherein the actual physical objects located within the environment include objects with a determined degree of permanence, and wherein spatial mapping data for actual physical objects whose determined degree of permanence is below a threshold permanence level is filtered out of the spatial mapping.

15. The computer system of claim 1, wherein segmented objects that are missing one or more particular tags are refrained from being included in the subset of virtual content.

16. The computer system of claim 1, wherein the spatial mapping is accessed from a cloud environment, or, alternatively, the computer system generates the spatial mapping by scanning the environment and then storing the spatial mapping locally on the computer system.

17. A computer system comprising:
one or more processors; and
one or more hardware storage devices having stored thereon computer-executable instructions that are executable by the one or more processors to cause the computer system to:
identify one or more segmented objects, the one or more segmented objects corresponding to virtual objects that are selected for potential rendering, wherein the one or more segmented objects omit tags flagging the one or more segmented objects as including content that is unsuitable for a particular type of user;
access a database of flagged virtual objects, the flagged virtual objects being associated with tags established by tagging input flagging the flagged virtual objects as including content that is unsuitable for a particular type of user, the tagging input being provided by one or more users interacting with the flagged virtual objects within a mixed-reality environment;
identify a subset of virtual content that is selectively chosen from the one or more segmented objects by causing a machine learning algorithm to check the database of flagged virtual objects to determine whether the one or more segmented objects that omit tags flagging the one or more segmented objects as including content that is unsuitable for a particular type of user share a relationship with one or more flagged virtual objects in the database of flagged virtual objects flagged as unsuitable for a particular type of user by one or more users interacting with the flagged virtual objects within a mixed-reality environment, the subset of virtual content including segmented objects of the one or more segmented objects that share a relationship with the one or more flagged virtual objects in the database of flagged virtual objects as determined by the machine learning algorithm; and
render and/or schedule for rendering at least some of the one or more segmented objects that are not included in the subset of virtual content while refraining from rendering and/or scheduling for rendering the segmented objects that are included in the subset of virtual content.

18. The computer system of claim 17, wherein the one or more segmented objects are represented by a spatial mapping that describes an environment three-dimensionally.

19. A computer system comprising:
one or more processors; and
one or more computer-readable hardware storage devices having stored thereon computer-executable instructions that are executable by the one or more processors to configure the computer system to:
project one or more virtual objects into a mixed-reality environment;

detect tagging input directed to a particular virtual object of the one or more virtual objects, the tagging input being provided by one or more users interacting with the particular virtual object within the mixed-reality environment; and in response to the tagging input, automatically modify or create metadata for the particular virtual object, wherein the metadata tags the particular virtual object as including content determined to be unsuitable for a particular type of user by the one or more users interacting with the particular virtual object within the mixed-reality environment, and wherein the metadata is operable to cause one or more systems operating within the mixed-reality environment to subsequently refrain from projecting the particular virtual object into the mixed-reality environment.

* * * * *